United States Patent [19]

Nicholas et al.

[11] Patent Number: 5,193,210
[45] Date of Patent: Mar. 9, 1993

[54] LOW POWER RF RECEIVER

[75] Inventors: Michael G. Nicholas, Hawthorn Woods; Warren Guthrie, Glen Ellyn, both of Ill.

[73] Assignee: ABC Auto Alarms, Inc., Elk Grove Village, Ill.

[21] Appl. No.: 737,256

[22] Filed: Jul. 29, 1991

[51] Int. Cl.$^5$ .............................................. H04B 7/00
[52] U.S. Cl. ................................... 455/38.1; 455/38.2; 455/226.1; 455/226.2; 455/226.3; 340/825.69; 307/10.2
[58] Field of Search ................. 455/38, 226, 208, 318, 455/352, 314; 340/825.31, 825.69, 825.72; 307/10.2, 10.5; 180/167, 287; 341/176

[56] References Cited

U.S. PATENT DOCUMENTS

| | | | |
|---|---|---|---|
| 2,608,648 | 8/1952 | Magnuski | 455/314 |
| 4,091,328 | 5/1978 | Hellman et al. | 340/825.69 |
| 4,368,539 | 1/1983 | Whidden | 455/226 |
| 4,429,418 | 1/1984 | Hooper | 455/314 |
| 4,603,325 | 7/1986 | Marino et al. | 455/226 |
| 4,619,002 | 10/1986 | Thro | 455/226 |
| 4,890,332 | 12/1989 | Takahashi | 455/226 |
| 4,914,428 | 4/1990 | Kobayashi et al. | 341/176 |

Primary Examiner—Reinhard J. Eisenzopf
Assistant Examiner—Timothy H. Keough
Attorney, Agent, or Firm—Silverman, Cass & Singer

[57] ABSTRACT

A low powered RF receiver for receiving a modulated carrier having a coded transmission so as to remotely control a number of vehicular devices includes an antenna, a preamp stage, mixer, local oscillator, first and second IF bandpass filters, first and second IF amplifiers, a received signal strength indicator/detector circuit, and an adaptive threshold/filter circuitry. The signal strength indicator/detector circuit is interconnected between the first and second IF amplifiers and generates a strength indicator signal which is proportional to the strength of the modulated carrier signal received. The adaptive threshold/filter circuitry is responsive to the strength indicator signal and has a varied threshold reference level for eliminating noise and for converting the strength indicator signal to a logical level. A microcontroller is provided for further signal processing, decoding, and executing the function corresponding to the vehicular device to be controlled.

20 Claims, 4 Drawing Sheets

BLOCK DIAGRAM OF TRANSMITTER

BLOCK DIAGRAM OF RECEIVER

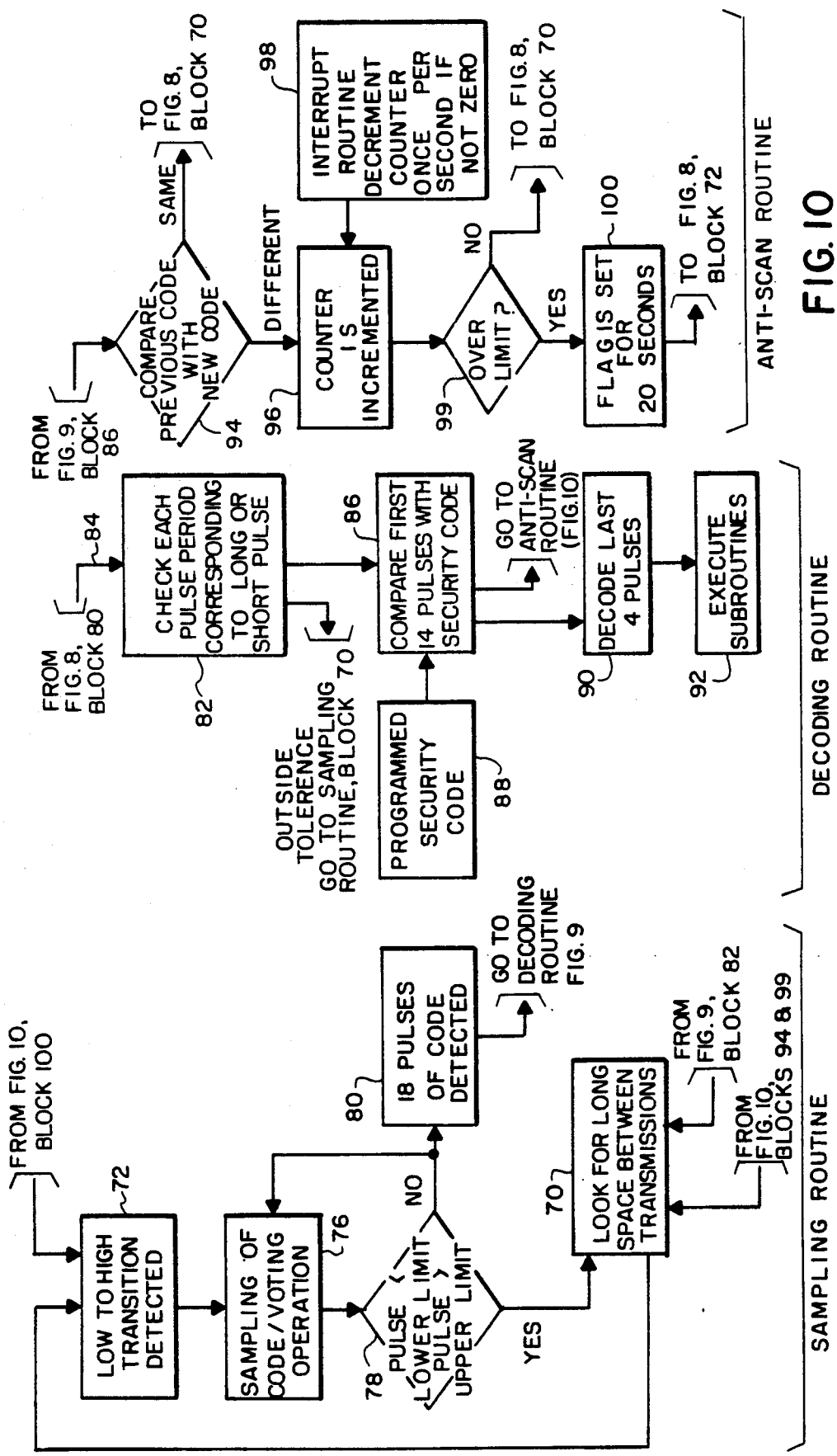

LOW POWER RF RECEIVER

BACKGROUND OF THE INVENTION

This invention relates generally to radio communication systems and more particularly, it relates to an improved low power RF receiver being responsive to modulated or keyed carrier signals for remotely controlling a number of vehicular devices which has an increased sensitivity over the traditional receivers now available. In particular, the RF receiver of the present invention has specific applications in remotely controlling vehicular devices, such as arming or disarming an alarm system, locking and unlocking doors, opening a trunk or hatch, starting the vehicle, locating or finding a vehicle, and the like. Also, the present RF receiver may be used for garage door operators, for turning ON/OFF of equipment of an entertainment system (radio, television, etc.), and for home security systems.

As is well-known in the prior art, the vehicular security systems or garage door operators typically require the use of superregenerative receivers with keyed carrier transmitters with frequencies operating between 270 MHz and 400 MHz. As specified by the Federal Communications Commission (FCC) under their Rules and Regulations Part 15, Subpart E, the emission of RF energy on the fundamental frequency for a transmitter operating in the frequency range of 260–420 MHz is limited to 3,750 to 12,500 uV/m (linearly interpolated) at 3 m. Further, under this specific FCC classification the spurious emissions from a radio receiver must not exceed 200 uV/m at 3 m in the frequency range between 216-960 MHz. Under this criteria for the transmitter and the superregenerative receiver, the operating distance is usually limited approximately to the range of 100–200 feet.

It would therefore be desirable to provide an RF receiver for receiving signals from a keyed carrier transmitter which has a much improved sensitivity. The present RF receiver performed adequately at distances of over 500 feet away from the transmitter so as to remotely start a vehicle or functioning to locate a vehicle.

SUMMARY OF THE INVENTION

In a preferred embodiment of the present invention, there is provided a low power RF receiver for receiving a modulated carrier signal having a coded transmission so as to remotely control a number of vehicular devices which includes an input means responsive to the modulated carrier signal for generating a RF signal, oscillator means for generating a desired local oscillator frequency signal, and a mixer means responsive to the RF signal and the local oscillator frequency signal for generating an IF signal. A first filter means is responsive to the IF signal for generating a first filtered signal. A first IF amplifier means is responsive to the first filtered signal for generating a first amplified signal. A second filter means is responsive to the first amplified signal for generating a second filtered signal.

Second IF amplifier means is responsive to the second filtered signal for generating a second amplified signal. There is also provided means responsive to the amount of current drawn by the first and second IF amplifier means for generating an strength indicator signal which is proportional to the strength of the modulated carrier signal received by the input means. An adaptive filter means is provided which is responsive to the strength indicator signal and has a varied threshold reference level for eliminating noise and for converting the strength indicator signal to a logical signal.

With this arrangement, the present RF receiver has a much improved sensitivity and generates less spurious RF noise. The adaptive filter means having the varied threshold reference level provides optimal performance under all environmental conditions. In another aspect of the invention, there is provided a microcontroller for processing the logical signal containing a series of coded pulses for controlling the number of vehicular devices.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 8 is a functional flow chart illustrating the sampling routine of the present invention;

FIG. 9 is a functional flow chart of the decoding routine of the present invention; and FIG. 10 is a functional flow chart of the antiscan routine of the present invention.

DESCRIPTION OF THE PREFERRED EMBODIMENT

Figure 1:
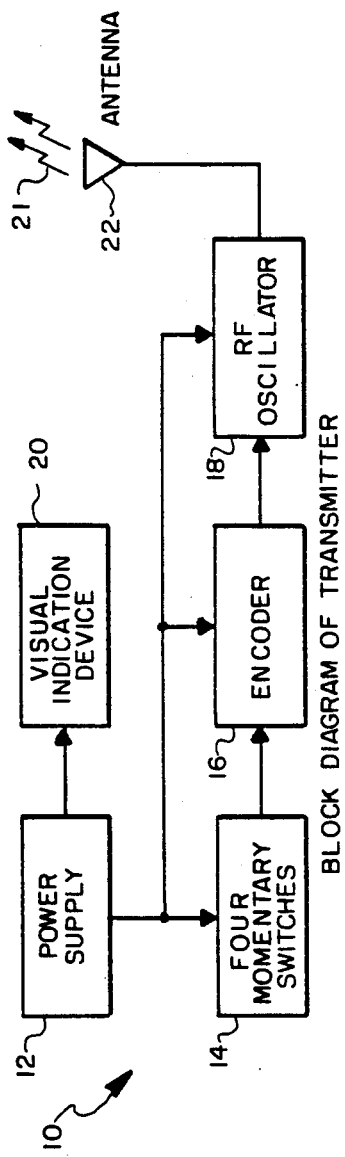
FIG. 1 is a simplified block diagram of a transmitter which may be used in conjunction with the RF receiver of the present invention.

Referring now in detail to the drawings, there is shown in FIG. 1 a simplified block diagram of a transmitter 10 for generating modulated or keyed carrier signals. The transmitter 10 is comprised of a power supply 12, four momentary switches 14, an encoder 16, an RF oscillator 18, a visual indicator device 20, and an antenna 22. The RF oscillator 18 supplies the basic frequency of the modulated carrier signal. The output of the encoder 16 is connected to the input of the RF oscillator 18 so as to key the oscillator ON and OFF so as to cause modulation of the basic carrier frequency. The encoder 16 is programmable so as to allow selection of different security codes for the transmitter 10. The four momentary switches 14 correspond to four different channels, each channel being used to remotely control a different desired function, i.e., arming an alarm system on a vehicle. The visual indicator device 20 includes a light-emitting diode (LED) device which provide visual feedback when one of the momentary switches 14 is depressed.

In operation, when one of the switches 14 is depressed, the power supply 12 is connected to the encoder 16, the oscillator 18, and visual indicator device 20. As a result, an encoded modulated carrier signal 21 is provided by the antenna 22, which is radiated to a low power RF receiver 24 of the present invention by atmospheric transmission. For example, the encoded carrier signal may be transmitted serially in the form of nine bits of trinary data where each bit is encoded as two pulses. A "one" is represented by two long pulses, and a "zero" is represented by two short pulses. An "open" is provided by a long pulse followed by a short pulse. Such an encoder may be of the type commercially available from Motorola which is sold under their Part No. MC145026. In the present transmitter, seven of the nine bits is utilized as a user security code and the remaining two bits are used to indicate which of the four channels was depressed. Accordingly, the transmitted data is in the form of 18 long and/or short pulses.

Figure 2:
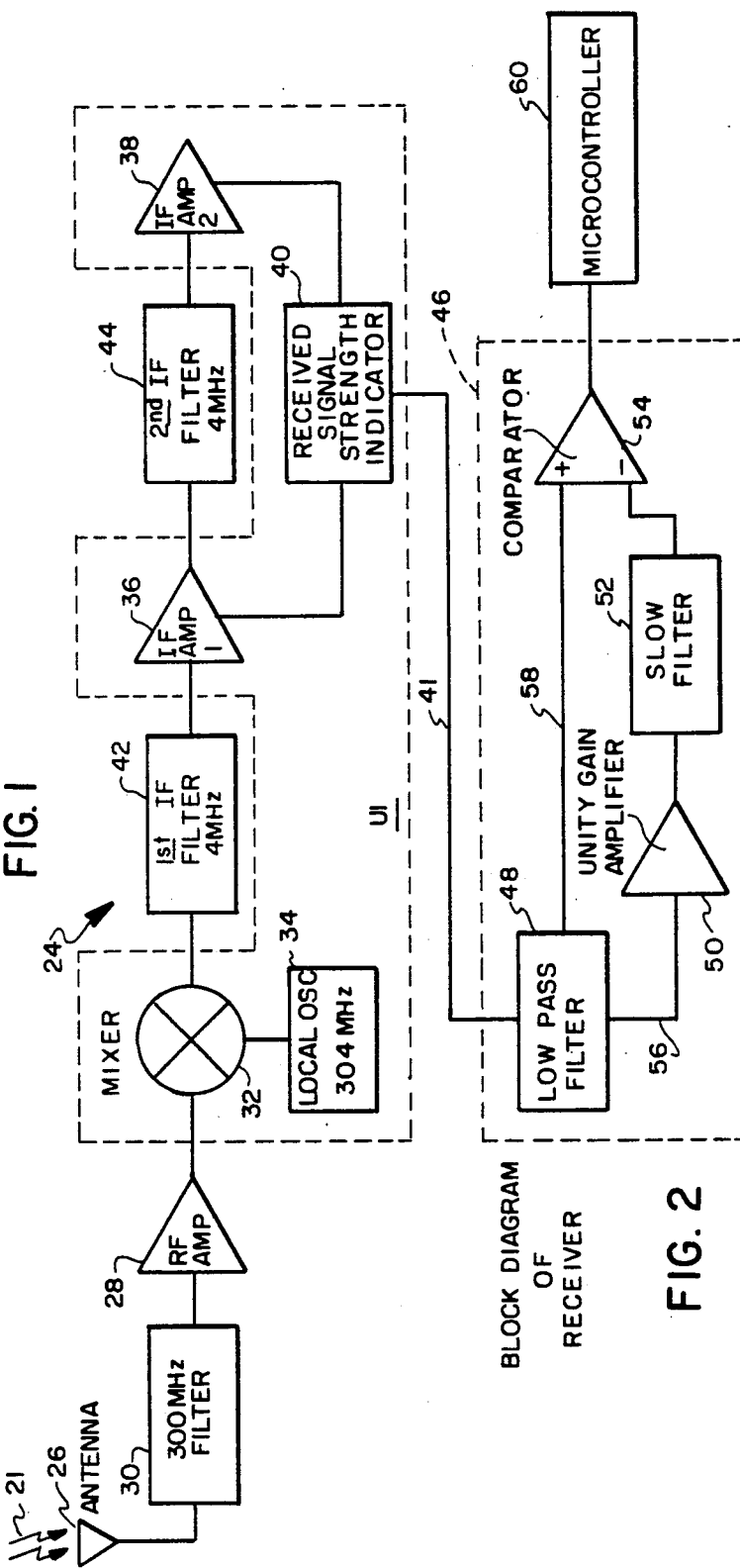
FIG. 2 is a block diagram of a RF receiver, constructed in accordance with the principles of the present invention.

FIG. 2 shows a block diagram of a low power RF receiver 24, constructed in accordance with the principles of the present invention for processing the encoded carrier signal 21 with the format transmitted by the transmitter 10 of FIG. 1. A tuned dipole antenna 26 receives the modulated carrier signal 21 from the transmitter 10. The antenna is capacitively coupled to a preamp stage 28 of the receiver via a matching circuit 30. The matching circuit 30 is used to match the impedance of the antenna 26 to the receiver so as to insure that the maximum amount of the transmitted signal is received. Further, the matching circuit 30 functions as a wideband filter having a center frequency at approximately 300 MHz so as to eliminate or filter out unwanted low and high frequency signals which are outside of the range to be processed by the receiver 24. The preamp stage 28 is comprised of a RF amplifier which provides approximately 12 dB gain at the frequency of 300 MHz.

The receiver 24 further includes a single Application Specific Integrated Circuit U1 which may be type NE615 manufactured by Signetics Corp. The integrated circuit U1 is referred to as a consumer monolithic, low power mixer FM IF system and is comprised of a Gilbert Cell mixer 32 with a local oscillator 34, a first intermediate frequency (IF) amplifier 36, a second IF amplifier 38, and a logarithmic received signal strength indicator/detector 40. The integrated circuit U1 includes an NPN transistor for the local oscillator 34 so that only external reactive components are required to be connected in order to set the desired frequency of the local oscillator. The local oscillator is preferably connected as a Colpitts L/C tank oscillator having a frequency of 304 MHz.

The amplified RF signal from the output of the RF amplifier 28 is then coupled to the mixer 32 which, in combination with the local oscillator 34, converts the frequency of the amplified RF signal to a new intermediate frequency. For example, if the signal output from the RF amplifier 28 has a frequency component at 300 MHz and the local oscillator 34 is set to run at 304 MHz, then the signal output from the mixer 32 will contain a frequency component at 4 MHz.

The output of the mixer 32 is inputted to a first IF bandpass filter 42 having a center frequency of 4 MHz so that it passes the desired first order product of the mixer 32. The output of the bandpass filter 42 is fed to the first IF amplifier 36 where the signal is amplified approximately 40 dB. The output of the first IF amplifier 36 is then fed to a second IF bandpass filter 44 with a center frequency of 4 MHz. The second filter 44 serves to match the output impedance of the first IF amplifier 36 to the input impedance of the second IF amplifier 44. Further, the second filter 44 functions to generate an interstage insertion loss of 12 dB for stabilization and for maintaining the output signal from the detector 40 to be linear. The output of the second filter 44 is connected to the input of the second IF amplifier 38 where the signal is further amplified approximately by another 60 dB.

The output of the integrated circuit U1 is taken from the output of the detector 40 rather than from the output of the second IF amplifier 38. The received strength signal indicator/detector 40 is interconnected between the first and second IF amplifiers and provides the RSSI output signal on line 41 which is proportional to the amount of current drawn by the two amplifiers 36 and 38 that is, in turn, proportional to the strength of the incoming modulated carrier signal. As previously discussed, this incoming carrier signal will be a series of alternating "1's" and "φ's" in the pattern of the digital code when the transmitter is activated, assuming that the transmitter is within the operating range, i.e., approximately 500 feet.

The RSSI output signal is fed to an adaptive threshold/filter circuitry 46 which filters the signal and performs a comparator function so as to convert such signal to a low or high logical signal. The adaptive threshold/filter circuit 46 is comprised of an RC low pass filter 48 for removing any high frequency noise, a unity gain amplifier 50, a slow filter 52, and a comparator 54. The low pass filter 48 is used to split the signal along two paths. The first path is on line 56 which is connected to the input of the amplifier 50 having a unity gain configuration. The output of the amplifier 50 is fed to the input of the slow filter 52 having a very long time constant. The output of the slow filter 52 is connected to the inverting input of the comparator 54. A second path is on line 58 in which the signal is reduced to nine-tenths of its original value and is then fed to the non-inverting input of the comparator 54.

In the absence of any incoming carrier signal 21, the capacitor in the slow filter 52 will become charged up equal the quiescent value of the RSSI output signal on the line 41 so as to provide a threshold reference voltage to the inverting input of the comparator. Since only nine-tenths of this quiescent value of the RSSI output signal on the line 58 is fed to the non-inverting input of the comparator 54, it will be less than the threshold reference voltage at the inverting input of the comparator and such comparator output will produce a low logical signal (logic "φ"). If, on the other hand, when an incoming carrier signal is received or if any instantaneous noise is stronger than the quiescent value of the RSSI output signal, a voltage will be produced at the non-inverting input of the comparator which is greater than such threshold reference voltage so as to cause the comparator output to produce a high logical signal (logic "1").

However, if the incoming signal or instantaneous noise persists long enough for the capacitor in the slow filter 52 to charge up, a new quiescent value will be produced so as to vary the threshold reference voltage at the inverting input of the comparator 54. As a consequence, the comparator output will go back to the low logical signal. It will be noted that the unity gain amplifier and the slow filter serve to provide an adaptive threshold reference voltage to the inverting input of the comparator 54.

This adaptive threshold voltage is increased or decreased dependent upon the environmental conditions so as to produce an optimal performance. For instance, if the ambient temperature rises so as to increase thermal noise or if the receiver is located in an environment with more RF noise, the quiescent value of the RSSI output signal on the line 41 and thus the threshold reference voltage at the inverting input of the comparator 54 will be raised correspondingly. On the other hand, if the ambient temperature falls so as to decrease the thermal noise or if the receiver is located in an environment with less RF noise, then the threshold reference voltage will be lowered accordingly.

The output of the comparator 54 consists of a series of pulses containing the transmitted code when the transmitter is depressed within the rang of the receiver and is fed to the input of a microcontroller 60. The microcontroller 60 may be of the type 80C51 manufactured by Intel. The microcontroller 60 performs a sampling routine on the received pulse train, a data decoding routine, and an anti-scan routine, as shown in FIGS. 8-10, so as to execute the function corresponding to the transmitter channel that was depressed.

Figure 3:
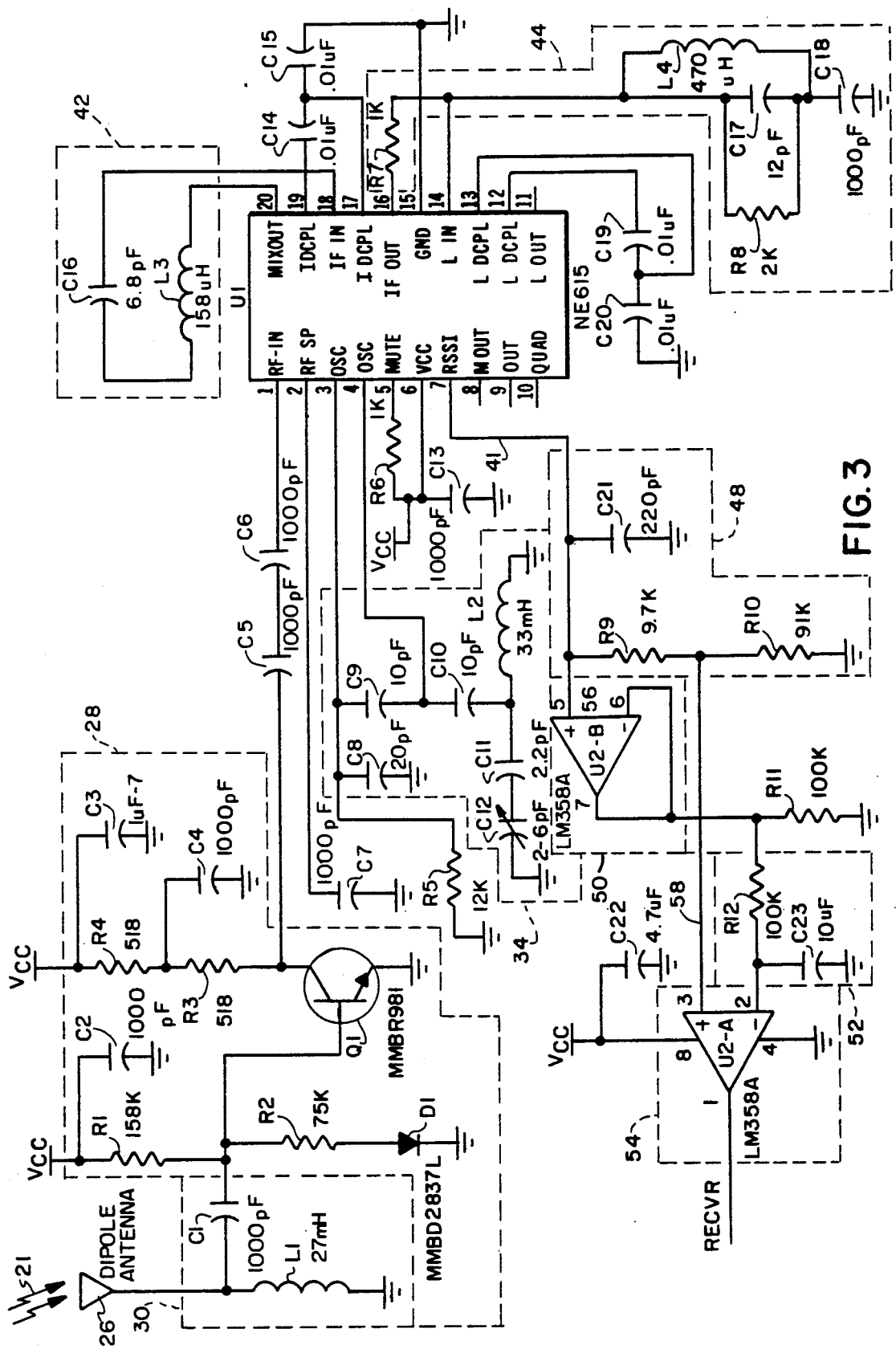
FIG. 3 is a schematic circuit diagram of the RF receiver of FIG. 2.

FIG. 3 is a detailed schematic circuit diagram of the low power RF receiver 24 of FIG. 2, except for the microcontroller 60. It should be noted that dotted lines have been placed around components in the schematic circuit diagram which are associated with the corresponding blocks of Figure and have been labeled with like reference numerals. The incoming modulated carrier signal 21 is received by the tuned dipole antenna 26 which is connected through the inductor L1 to the ground potential and is capacitively coupled to the preamp stage 28 via the capacitor C1. The preamp stage 28 is formed of a single RF transistor Q1 whose base is connected to the capacitor C1. The resistors R1-R4 are used to set up the DC bias for the transistor Q1. The capacitors C2 and C3 are used to bypass high frequency noise on the power supply lines. The collector of the transistor Q1 defining the output of the preamp stage 28 is connected through capacitors C5 and C6 to the input of the Gilbert Cell mixer 32 (FIG. 2) on Pin 1 of the integrated circuit U1.

The local oscillator 34 is comprised of capacitors C8 through C12 and an inductor L2 which are connected to form the Colpitts L/C tank oscillator that are joined between Pins 3 and 4 of the integrated circuit U1. The oscillator frequency is adjusted by tuning the variable capacitor C12. The resistor R5 is used to supply additional bias to the NPN transistor internally of the integrated circuit U1. The output of the mixer 32 on Pin 20 of the integrated circuit U1 is fed to the input of the first bandpass filter 42 which is formed of a series LC filter (inductor L3 and capacitor C16). The filter 42 is centered at the frequency of 4 MHz with a bandwidth of approximately 1.6 MHz. The output of the filter 42 is delivered to the input of the first IF amplifier 36 located at Pin 18 of the integrated circuit U1. The output of the first amplifier 36 on Pin 16 is connected to the input of the second bandpass filter 44. The filter 44 has an L-pad configuration consisting of a series resistor R7 and a shunt RLC trap (resistor R8, inductor L4, and capacitor C17).

Figure 4:
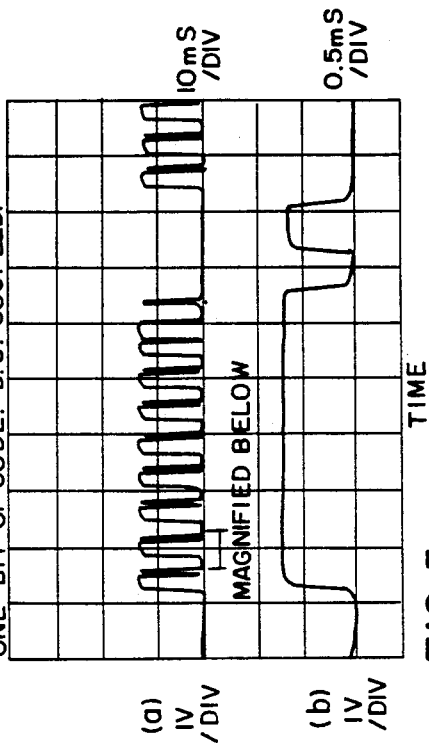
FIGS. 4(a) and 4(b) illustrate the outputs of the mixer 32 and the second IF amplifier 38, respectively.

There is shown in FIG. 4(a) the output of the mixer 32 upon receiving a typical transmitted signal. FIG. 4(a) is a plot containing one complete nine bits of transmission plus the first two bits of the next transmission. FIG. 4(b) illustrates the output of the second IF amplifier 38.

As can be seen, the first 7 bits represents "open" which is defined by a wide pulse followed by a narrow pulse. The eighth bit represents a "high" which is defined by two wide pulses. Finally, the ninth bit represents a "low" which is defined by two narrow pulses.

Figure 5:
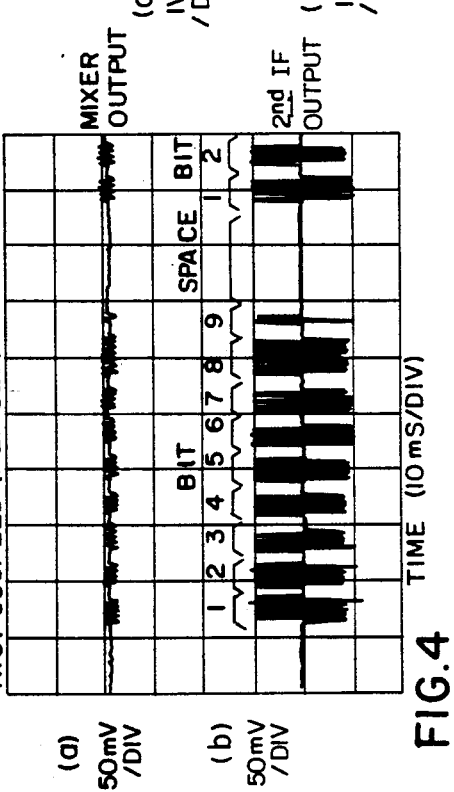
FIGS. 5(a) and 5(b) illustrate the output of the signal strength indicator 40.

The output of the received signal strength indicator/detector circuit 40 is provided on Pin 7 of the integrated circuit U1 and is connected to the low pass filter 48 so as to remove any high frequency noise while passing the received signal which alternates on the order of 1 KHz. The filter 48 consists of resistors R9, R10 and a capacitor C21. The resistors R9, R10 also function as a pull-down resistor having a value of approximately 100K ohms in order to maintain the linearity of the RSSI output signal, which is an output current. There is depicted in the top trace (FIG. 5(a)) the output of the signal strength indicator/detector circuit 40. Again, the plot of FIG. 5(a) contains all nine bits of transmission plus the beginning bits of the next transmission. In the lower trace (FIG. 5(b)), one bit of the received code has been magnified.

Figure 6:
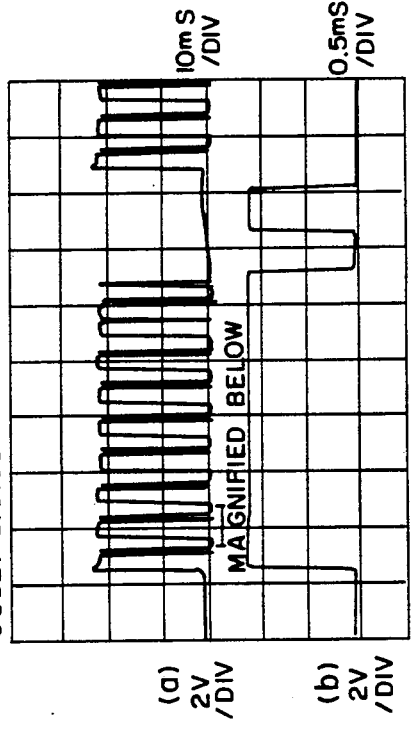
FIGS. 6(a) and 6(b) illustrate the output of the comparator 54.

The first output of low pass filter 48 on the line 56 is connected to the non-inverting input (Pin 5) of the unity gain amplifier U2B (50). The amplifier U2B may be a type LM358A which is manufactured by National Semiconductor. The output of the amplifier U2B is connected to the slow filter 52 formed by the resistor R12 and a capacitor C23. A junction of the resistor R12 and the capacitor C23 is tied to the inverting input (Pin 2) of the comparator U2A (54). The comparator U2A may also be a type LM358A. The second output of the filter 48 is taken from the junction of the resistors R9 and R10 defining a voltage divider, which reduces the signal to nine-tenths of its value, and is fed to the non-inverting input (Pin 5) of the comparator U2A. FIG. 6(a) shows the logical signal at the output of the comparator U2A defining the output of the RF receiver 24. It will be noted that FIG. 6(a) contains all nine bits of transmission and is quite similar to FIG. 5(a), except that the received signal has been squared up and converted to a 0 -5 volts logic level.

Figure 7:
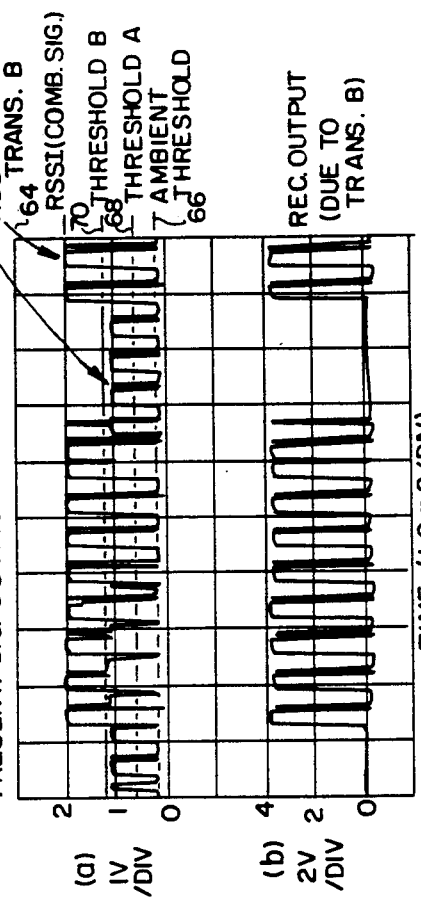
FIGS. 7(a) and 7(b) illustrate how the adaptive threshold/filter circuitry 46 functions so as to remove noise.

In FIGS. 7(a) and 7(b), there is illustrated how the adaptive threshold/filter circuitry 46 functions so as to remove noise. In this case, the noise is represented by a second transmitter A which is located about twice as far from the RF receiver 24 as a first transmitter B. As can be seen from FIG. 7(a), the composite RSSI output signal being received consists of curve 62 due to the transmitter A and curve 64 due to the transmitter B. The curve 66 shows the ambient threshold level, which is about 0.25 volts, as received on the capacitor C23 of the slow filter 52 when neither transmitter A or transmitter B is depressed. When the second transmitter A being the one further away is depressed, the threshold level A represented by curve 68 is moved up to approximately 0.5 volts. When the first transmitter B (the nearer one) is also depressed, the threshold level B represented by curve 70 is further moved up to about 1.25 volts. It will be noted that this threshold level of the curve 70 is above the signal level from the second transmitter A (noise), which has a peak around 1.1 volts, but is below the signal level of the first transmitter B (i.e., 2 volts).

FIG. 7(b) illustrates the output of the RF receiver when both transmitters A and B are depressed. It should be apparent that the signal level from the second transmitter A, which is below the threshold level B, has been subtracted off and only the signal level due to the first transmitter B remains, which has been squared up and centered to logic levels. In this manner, the noise caused by the second transmitter A will not affect the operation of the first transmitter B due to the adaptive threshold. In other words, the threshold level B has been moved or raised above the noise, thereby eliminating its effect.

The output of the RF receiver, as illustrated in FIG. 7(b) contains 18 long and/or short pulses for the trinary coded transmission and is fed to the input of the microcontroller 60 which executes initially a sampling routine in accordance with the functional flow chart of FIG. 8. The sampling routine is started in block 72 when a low-to-high transition is detected on the input of the microcontroller 60 so as to cause block 76 to begin a sampling voting operation. In block 76, the coded transmission is continuously sampled and a three-out-of-five voting operation is performed on the samples so as to act as a digital filter. In other words, if three, four, or five out of every five samples are high, the signal is considered to be a "high" level. On the other hand, if zero, one or two out of the five samples are high the signal is considered to be a "low" level.

This digital filtering operation serves to filter out an glitches existing in the signal. The program carries out in the block 76 hundreds of samples for each pulse and measures the length thereof. In this manner, there is prevented the possibility of making an error due to assuming that an incorrect code is correct or ignoring a correct code. In decision block 78 each pulse is checked to determine if it is shorter than a lower limit or is longer than an upper limit. If such a pulse is determined to be shorter or longer, then the remainder of that transmission is ignored and the program begins looking for the end of the code transmission, i.e., a very long space, in block 70, so it will be aligned with the beginning of a new transmission in block 72. Otherwise, the sampling is continued by the block 76. If all 18 pulses of the code transmission are detected in block 80, then the microprocessor 60 will execute a trinary data decoding routine in accordance with the functional flow chart of FIG. 9.

In FIG. 9, the decoding routine is started in block 82 where each of the input pulses checked to determine if it was high for a period of time corresponding to a long pulse or a short pulse. If any of the pulses are found to be outside of the tolerance for either a long pulse or a short pulse in the block 82, then the program starts looking for a new code transmission at point 70 in FIG. 8. Otherwise, the 18 pulses after being checked in the block 82 are passed through to comparison block 86 where the first fourteen pulses are compared against a programmable security code stored in block 88. If the code transmitted matches the programmable security code, then the last four pulses are decoded in block 90 in order to determine which one of the four switches and associated channel was depressed. Then, block 92 executes the subroutine associated with that particular channel, i.e., arming the vehicular alarm system, locking the vehicle doors, disabling of the vehicular start circuit, etc.

If the code transmission does not match with the stored program security code, then the microcontroller 60 under control of a software program will execute an antiscan routine in accordance with the functional flow chart of FIG. 10. In FIG. 10 block 94 compares the previously received code transmission with the newly received code transmission, which becomes, in turn, the previous code transmission for the next code transmitted. If the two codes do not match, a counter block 96 is started to run and is incremented. The counter block is periodically decremented by an interrupt routine stored in block 98. If the counter in the block 96 reaches a predetermined limit corresponding to an excessive number of wrong codes within a short period of time, then a flag is set in block 100 that causes any incoming signal from the receiver to be ignored for 20 seconds. This antiscan routine prevents an unauthorized user from trying to go through all of the possible code combinations so as to electronically "pick the lock."

The present low power RF receiver has the following advantages over the prior art superregenerative receivers:

(1) it uses a mixer to heterodyne and thus translates the frequency of the received RF signals to provide better selectivity;

(2) it has an improved sensitivity and generates less spurious RF noises;

(3) it utilizes an adaptive threshold/filter circuit so as to provide optimal performance under all environmental conditions;

(4) it utilizes digital signal processing for filtering the coded signal so as to prevent possible errors; and (5) it has an antiscan routine for preventing an unauthorized user from quickly going through all the possible codes, thereby enhancing its security.

From the foregoing detailed description, it can thus be seen that the present invention provides an improved low power RF receiver which is responsive to modulated or keyed carrier signals for remotely controlling a number of vehicular devices which has increased sensitivity and generates less spurious RF noises. The RF receiver of the present invention includes a receive signal strength indicator/detector circuit which is responsive to the amount of current drawn by first and second IF amplifiers for generating a strength indicator signal which is proportional to the strength of a modulated carrier signal received, and an adaptive threshold/filter circuitry being responsive to the strength indicator signal and having a varied threshold reference level for eliminating noise and for converting the strength indicator signal to a logical signal.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A low power RF receiver for receiving a modulated carrier signal having a coded transmission so as to remotely control a number of vehicular devices comprising:

input means responsive to said modulated carrier signal for generating a RF signal;

oscillator means for generating a desired local oscillator frequency signal;

mixer means responsive to said RF signal and said local oscillator frequency signal for generating an IF signal;

first filter means responsive to said IF signal for generating a first filtered signal;

first FI amplifier means responsive to said first filtered signal for generating a first amplified signal;

second filter means responsive to said first amplified signal for generating a second filtered signal;

second IF amplifier means responsive to said second filtered signal for generating a second amplified signal;

signal strength means connected to said first and second IF amplifier means and responsive to the amount of current drawn by said first and second IF amplifier means, said signal strength means generating a strength indicator signal derived form assumed current of the first and second amplified signal which is proportional to the strength of the modulated carrier signal received by said input means; and adaptive threshold means being responsive to comparing said strength indicator signal to a varied threshold reference level to eliminate noise and for generating a logical signal based on said comparison of said varied threshold reference level to said strength indicator signal.

2. A low power RF receiver as claimed in claim 1, wherein said input means includes a tuned dipole antenna for receiving said modulated carrier signal and a wideband filter coupled to said antenna for eliminating unwanted low and high frequency signals, and a RF amplifier connected to said wideband filter for generating said RF signal.

3. A low power RF receiver as claimed in claim 2, wherein said oscillator means includes a local frequency oscillator.

4. A low power RF receiver as claimed in claim 3, wherein said first filter means comprises a first bandpass filter which passes a desired first ordered product of said mixer means.

5. A low power RF receiver as claimed in claim 4, wherein said second filter means comprises a second bandpass filter for matching the output impedance of said first amplifier means with the input impedance of said second amplifier means by providing an interstage loss so as to maintain stability.

6. A low power RF receiver as claimed in claim 1, wherein said signal strength means for generating said strength indicator signal comprises a received signal strength indicator circuit.

7. A low power RF receiver as claimed in claim 1, wherein said adaptive threshold means includes a low pass filter connected to said signal strength means, a unity gain amplifier connected to said low pass filter, a slow filer connected to said unity gain amplifier, and a comparator connected to said low pass filter and said slow filter.

8. A low power RF receiver as claimed in claim 7, wherein said low pass filter has an input connected to receive said strength indicator signal, a first output coupled to a first input of said comparator by way of said unity gain amplifier and said slow filter, and a second output connected to a second input of said comparator, said comparator having an output for providing said logical signal.

9. A low power RF receiver as claimed in claim 1, further comprising microcontroller means for processing said logical signal containing a series of coded pulses defining functions relating to said received modulated carrier signal, said functions defining operation for controlling vehicular devices.

10. A low power RF receiver for receiving a modulated carrier signal having a coded transmission so as to remotely control a number of vehicular devices comprising:

input means responsive to said modulated carrier signal for generating a RF signal;

oscillator means for generating a desired local oscillator frequency signal;

mixer means responsive to said RF signal and said local oscillator frequency signal for generating an IF signal;

first filter means responsive to said IF signal for generating a first filtered signal;

first IF amplifier means responsive to said first filtered signal for generating a first amplified signal;

second filter means responsive to said first amplified signal for generating a second filtered signal;

second IF amplifier means responsive to said second filtered signal for generating a second amplified signal;

signal strength means connected to said first and second IF amplifier means and responsive to the amount of current drawn by said first and second IF amplifier means, said signal strength means generating a strength indicator signal derived form a summed current of the first and second amplified signals which is proportional to the strength of the modulated carrier signal received by said input means;

adaptive threshold means being responsive to comparing said strength indicator signal to a varied threshold reference level to eliminate noise and for generating a logical signal based on said comparison of said varied threshold reference level to said strength indicator signal; and microcontroller means for processing said logical signal containing a series of coded pulses defining functions relating to said received modulated carrier signal, said functions defining operations to control the vehicular devices.

11. A low power RF receiver as claimed in claim 10, wherein said input means includes a tuned dipole antenna for receiving said modulated carrier signal and a wideband filter coupled to said antenna for eliminating unwanted low and high frequency signals, and a RF amplifier connected to said wideband filter for generating said RF signal.

12. A low power RF receiver as claimed in claim 11, wherein said oscillator means includes a local frequency oscillator.

13. A low power RF receiver as claimed in claim 12, wherein said first filter means comprises a first bandpass filter which passes a desired first ordered product of said mixer means.

14. A low power RF receiver as claimed in claim 13, wherein said second filter means comprises a second bandpass filter for matching the output impedance of said first amplifier means with the input impedance of said second amplifier means by providing an interstage loss so as to maintain stability.

15. A low power RF receiver as claimed in claim 10, wherein said signal strength means for generating said strength indicator signal comprises a received signal strength indicator/detector circuit.

16. A low power RF receiver as claimed in claim 10, wherein said adaptive threshold means includes a low pass filter connected to said signal strength means, a unity gain amplifier connected to said low pass filter, a low filter connected to said low pass filter, and a comparator connected to said low pass filter and said slow filter.

17. A low power RF receiver as claimed in claim 16, wherein said low pass filter has an input connected to receive said strength indicator signal, a first output coupled to a first input of said comparator by ways of said unity gain amplifier and said slow filter, and a second output connected to a second input of said comparator, said comparator having an output for providing said logical signal.

18. A low power RF receiver as claimed in claim 10, wherein said microcontroller means includes sampling means for continuously sampling each of said coded pulses and for performing a three-out-of-five voting operation on said sampled pulses so as to insure that a correct code is detected.

19. A low power RF receiver as claimed in claim 18, wherein said microcontroller means further includes decoding means for comparing each of the pulses in the code transmission with a stored security code.

20. A low power RF receiver as claimed in claim 19, wherein said microcontroller means further includes anti-scan means for locking out said modulated carrier signal when a certain number of unmatches between said pulses in the coded transmission and said stored security code has occurred from said decoding means within a short period of time.

* * * * *

UNITED STATES PATENT AND TRADEMARK OFFICE
CERTIFICATE OF CORRECTION

PATENT NO.  : 5,193,210
DATED       : March 9, 1993
INVENTOR(S) : Michael G. Nicholas and Warren Guthrie It is certified that error appears in the above-indentified patent and that said Letters Patent is hereby corrected as shown below:

```
Column  5, line 16, change "rang" to --range--;

line 29, after "Figure" insert --2--;

Column  7, line 23, change "an" to --any--;

line 65, after "Fig. 10" insert a comma (,);

Column  9, line 6, change "FI" to --IF--;

lines 17-18, change "form assumed" to -- from
           a summed --.

line 56, change "filer" to --filter--;

Column 10, line 29, change "form" to --from--;

Column 11, line 11, change "ways" to --way--.
```

Signed and Sealed this

Twelfth Day of April, 1994

Attest:

BRUCE LEHMAN

*Attesting Officer*

*Commissioner of Patents and Trademarks*